United States Patent
Balmin et al.

(10) Patent No.: US 7,865,502 B2
(45) Date of Patent: Jan. 4, 2011

(54) OPTIMIZATION OF EXTENSIBLE MARKUP LANGUAGE PATH LANGUAGE (XPATH) EXPRESSIONS IN A DATABASE MANAGEMENT SYSTEM CONFIGURED TO ACCEPT EXTENSIBLE MARKUP LANGUAGE (XML) QUERIES

(75) Inventors: Andrey Balmin, San Jose, CA (US); Fatma Ozcan, San Jose, CA (US); Tam Minh Dai Tran, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 440 days.

(21) Appl. No.: 12/101,141

(22) Filed: Apr. 10, 2008

(65) Prior Publication Data
US 2009/0259641 A1 Oct. 15, 2009

(51) Int. Cl.
G06F 7/00 (2006.01)
(52) U.S. Cl. .................................. 707/713; 707/714
(58) Field of Classification Search .................... 707/2, 707/713, 714, 716, 718, 719
See application file for complete search history.

(56) References Cited

U.S. PATENT DOCUMENTS

| 6,738,755 | B1 | 5/2004 | Freytag et al. | |
|---|---|---|---|---|
| 6,757,677 | B2 * | 6/2004 | Pham et al. | 1/1 |
| 6,829,606 | B2 | 12/2004 | Ripley | |
| 6,947,927 | B2 | 9/2005 | Chaudhuri et al. | |
| 7,020,651 | B2 | 3/2006 | Ripley | |
| 7,062,481 | B2 * | 6/2006 | Pham et al. | 1/1 |
| 7,086,042 | B2 | 8/2006 | Abe et al. | |
| 7,107,282 | B1 | 9/2006 | Yalamanchi | |
| 7,315,852 | B2 | 1/2008 | Balmin et al. | |

(Continued)

OTHER PUBLICATIONS

Balmin et al., "Grouping and Optimization of XPath Expressions in System RX".

(Continued)

*Primary Examiner*—Hung T Vy
(74) *Attorney, Agent, or Firm*—Kunzler Needham Massey & Thorpe (57) ABSTRACT

An apparatus, system, and method are disclosed for optimization of XPath expressions in a database management system configured to accept XML queries. Operations of the method include receiving an XQuery representation and partitioning XPath expressions within the XQuery representation into a plurality of XPath expression clusters. The XPath expression clusters may comprise one or more XPath expressions and those in each cluster may operate on a common document. Furthermore, the XPath expressions in each cluster are hierarchically related to each other such that branch nodes of the cluster are executable independent of nodes in other XPath expression clusters. The method also defines merging the one or more XPath expressions into one or more expression trees for each XPath expression cluster. The method generates one or more query execution plans from the one or more XPath expression blocks. The method includes, for each query execution plan, splitting each of the XPath expression blocks into one or more ordered fragments. The method determines a cardinality according to database statistics and an execution cost for each XPath expression block within each query execution plan. Finally, the method determines an aggregate cardinality for each query execution plan and an aggregate execution cost for each query execution plan. Therefore, an XQuery may be optimized at both the global XQuery and local XPath expression block level, improving performance and reducing overhead.

20 Claims, 6 Drawing Sheets

U.S. PATENT DOCUMENTS

| | | | |
|---|---|---|---|
| 2003/0078909 A1* | 4/2003 | Pham et al. ............ | 707/1 |
| 2003/0078922 A1* | 4/2003 | Pham et al. ............ | 707/4 |
| 2003/0084025 A1 | 5/2003 | Zuzarte | |
| 2003/0163285 A1 | 8/2003 | Nakamura et al. | |
| 2003/0212662 A1 | 11/2003 | Shin et al. | |
| 2003/0225768 A1 | 12/2003 | Chaudhuri et al. | |
| 2003/0229617 A1 | 12/2003 | Rjaibi et al. | |
| 2004/0111396 A1 | 6/2004 | Musayev et al. | |
| 2004/0181521 A1 | 9/2004 | Simmen | |
| 2004/0236722 A1 | 11/2004 | Waas et al. | |
| 2004/0260675 A1* | 12/2004 | Bruno et al. ............ | 707/2 |
| 2004/0261019 A1 | 12/2004 | Imamura et al. | |
| 2005/0050016 A1 | 3/2005 | Stanoi et al. | |
| 2005/0091188 A1 | 4/2005 | Pal et al. | |
| 2005/0097078 A1 | 5/2005 | Lohman et al. | |
| 2005/0097084 A1 | 5/2005 | Balmin et al. | |
| 2005/0131914 A1 | 6/2005 | Abdo et al. | |
| 2005/0203957 A1 | 9/2005 | Wang et al. | |
| 2005/0228779 A1 | 10/2005 | Chaudhuri et al. | |
| 2005/0229158 A1 | 10/2005 | Thusoo et al. | |
| 2005/0235356 A1 | 10/2005 | Wang | |
| 2005/0240624 A1 | 10/2005 | Ge et al. | |
| 2005/0257201 A1 | 11/2005 | Rose et al. | |
| 2005/0267866 A1 | 12/2005 | Markl et al. | |
| 2006/0064432 A1 | 3/2006 | Pettovello | |
| 2006/0075000 A1 | 4/2006 | Kleewein et al. | |
| 2006/0106758 A1 | 5/2006 | Chen et al. | |
| 2006/0218194 A1 | 9/2006 | Yalamanchi | |
| 2007/0162426 A1 | 7/2007 | Brown et al. | |
| 2007/0208769 A1 | 9/2007 | Boehm et al. | |
| 2007/0233645 A1 | 10/2007 | Peterson et al. | |
| 2007/0245325 A1 | 10/2007 | Lapounov et al. | |
| 2007/0250473 A1 | 10/2007 | Larson et al. | |
| 2007/0299834 A1 | 12/2007 | Liu et al. | |
| 2008/0222087 A1* | 9/2008 | Balmin et al. ............ | 707/2 |

OTHER PUBLICATIONS

Dunren et al., "Query Optimization in XML Structured-Document Databases", May 14, 2005.

Lukichev et al., "XML Query Algera for Cost-based Optimization", University of Saint-Petersburg.

Kader et al., "XQuery Optimization in Relational Database Systems".

Tao et al., "An Efficient Cost Model for Optimization of Nearest Neighbor Search in Low and Medium Dimensional Spaces", IEEE Transactions on Knowledge and Data Engineering, v. 16, n. 10, p. 1169-1184, Oct. 2004.

Pendersen et al., "Cost Modeling and Estimation for OLAP-XML Federations", Technical Report 02-5003, Aalborg University Dept. of CS, Dec. 2002.

"An Efficient Xpath Query Processor for XML Streams" Chen, Y.; Davidson, B.S.; Zheng, Y., IEEE 2006.

Freire et al., "A Flexible Infrastructure for Gathering XML Statistics and Estimating Query Cardinality," Proceedings of the 20 st Int'l Conference on Data Engineering, 2004.

Ramanath et al., "IMAX: Incremental Maintenance of Schema-Based XML Statistics," Proceedings of the 21st Int'l Conference on Data Engineering, 2005.

Beyer et al., "System RX: One Part Relational, One Part XML, " SIGMOD 2005, Jun. 14-16, 2005, Baltimore, MD, USA.

McHugh et al., "Query Optimization for XML," Proc. of Very Large Data Bases, Edinburgh, U.K., 1999.

"Efficient Evaluation of Multiple Queries on Streaming XML Data" ACM Digital Library/INSPEC, Lee, M.L. et al.; 2002.

"WMS and GML based Interoperable Web Mapping System" ACM Digital Library/INSPEC, Shekhar et al.; 2001.

"XSQ: A Streaming Xpath Engine" ACM Digital Library, Peng, F. et al.; 2005.

"Multi-level Operator Combination XML Query Processing" ACM Digital Library, Al-Khalifa, S. Et al.; 2002.

"An XML Query Engine for Network-Bound Data" ACM Digital Library, Ives, Z.G. et al.; 2002.

"Timber: A native XML database" Jagadish, H.V. et al., The VLDB Journal, 2002.

"Cost-based optimization in DB2 XML" Balmin, A. et al., IBM Systems Journal, vol. 45, No. 2, 2006.

"Cost-Sensitive Reordering of Navigational Primitives" Kanne, C.C. et al., ACM, 2005.

"Structural Join Order Selection for XML Query Optimization" Wu, Y. et al., IEEE 2003.

Balmin et al., "Grouping and Optimization of XPath Expressions in DB2 pureXML".

Re et al., "A Complete and Efficient Algebraic Compiler for XQuery".

Shanmugasundaram et al., "A General Technique for Querying XML Documents Using a Relational Database System".

Fiebig et al., "Anatomy of a Native XML Base Management System", VLDB Journal vol. 11, No. 4, Dec. 13, 2002.

Beyer et al., "DB2 Goes Hybrid: Integrating Native XML and XQuery With Relational Data and SQL", IBM Systems Journal, vol. 45, No. 2, 2006.

Pirahesh et al., "Extensible/Rule Based Query Rewrite Optimization in Starburst", IBM Almaden Research Center.

Koch et al., "FluXQuery: An Optimizing XQuery Processor for Streaming XML Data", Proceedings of the 30th VLDB Conference,Toronto, Canada, 2004.

Chen et al., "From Tree Patterns to Generalized Tree Patterns: On Efficient Evaluation of XQuery", Proceedings of the 29th VLDB Conference, Berlin, Germany 2003.

Brantner et al., "Full-fledged Algebraic XPath Processing in Natix".

Bruno et al., "Holistic Twig Joins: Optimal XML Pattern Matching", ACM SIGMOD 'Jun. 4-6, 2002

Balmin et al., "Cost-based optimization in DB2/XML", IBM Systems Journal, Feb. 16, 2006.

McHugh et al., "Lore: A Database Management System for Semistructured Data".

Halverson et al., "Mixed Mode XML Query Processing", Proceedings of the 29th VLDB Conference, Berlin, Germany, 2003.

Boncz et al., "MonetDB/XQuery: A Fast XQuery Processor Powered by a Relational Engine", SIGMOD 2006, Jun. 27-29, 2006.

Al-Khalifa et al., "Multilevel Operator Combination in XML Query Processing", CIKM'02, Nov. 4-9, 2002.

Liu et al., "Native XQuery Processing in Oracle XMLDB".

Diao et al., "Query Processing for High-Volume XML Message Brokering", Proceedings of the 29th VLDB Conference, Berlin, Germany, 2003.

Krishnaprasad et al., "Query Rewrite for XML in Oracle XML DB", Proceedings of the 30th VLDB Conference, Toronto, Canada, 2004.

Josifovski et al., "Querying XML Streams", The VLDB Journal (2004) / Digital Object Identifier (DOI) 10.1007/s00778-004-0123-7.

Wu et al., "Structural Join Order Selection for XML Query Optimization".

Beyer et al., "System RX: One Part Relational, One Part XML", SIGMOD 2005, Jun. 14-16, 2005.

Florescu et al., "The BEA Streaming XQuery Processor".

Naughton et al., "The Niagara Internet Query System".

Jagadish et al., "Timber: A Native XML Database".

TPC-H, TPC Transaction Processing Performance Council, http://www.tpc.org/tpch/, Mar. 6, 2008.

Yao et al., "XBench Benchmark and Performance Testing of XML DBMSs", Proceedings of the 20th International Conference on Data Engineering (ICDE'04) 2004 IEEE.

Rys, "XML and Relational Database Management Systems: Inside Microsoft® SQL Server™ 2005", SIGMOD 2005, Jun. 14-16, 2005.

Krishnamurthy et al., "XML-to-SQL Query Translation Literature: The State of the Art and Open Problems".

XQuery 1.0: An XML Query Language W3C Recommendation Jan. 23, 2007, http://www.w3.org/TR/xquery/.

XQuery 1.0 and XPath 2.0 Data Model (XDM) W3C Recommendation Jan. 23, 2007, http://www.w3.org/TR/xpath-datamodel/.

Johnson, Norman L. et al., "Univariate Discrete Distributions", 2005, John Wiley and Sons, Inc., Hoboken, New Jersey.

Cormen, Thomas H. et al., "Introduction to Algorithms", 1990, The MIT Press, Cambridge, Massachusetts.

* cited by examiner

OPTIMIZATION OF EXTENSIBLE MARKUP LANGUAGE PATH LANGUAGE (XPATH) EXPRESSIONS IN A DATABASE MANAGEMENT SYSTEM CONFIGURED TO ACCEPT EXTENSIBLE MARKUP LANGUAGE (XML) QUERIES

CROSS REFERENCE TO RELATED APPLICATIONS

This application is related to and incorporates herein by reference U.S. patent application Ser. No. 11/383,481, entitled "System and Method for Optimizing Query Access to a Database Comprising Hierarchically-Organized Data," filed May 15, 2006 for Andrey Balmin, Tom Eliaz, Guy Lohman, David Simmen, and Chun Zhang. This application is also related to and incorporates herein by reference U.S. patent application Ser. No. 11/613,944, entitled "Method and Apparatus for XML Query Evaluation Using Early-Outs and Multiple Passes," filed Dec. 20, 2006 for Fatma Özcan, and Edison Ting.

BACKGROUND OF THE INVENTION

1. Field of the Invention

This invention relates to Extensible Markup Language Path Language (XPath) Expressions and more particularly relates to optimization of XPath expressions in a database management system configured to accept Extensible Markup Language (XML) queries.

2. Description of the Related Art

XPath and XQuery are two common languages used to query for XML data from an XML document or from a database management system. XPath is a path expression language for selecting data within XML documents. XQuery is a language for querying, transforming, and constructing XML data. An expression is a string of unicode characters which may be constructed from keywords, symbols, and operands. XPath allows expressions to be nested. XQuery uses XPath expression syntax to address specific parts of an XML document and is semantically similar to structured query language (SQL). The SQL-like XQuery syntax uses "For," "Like," "Where," "Order by," and "Return" clauses in a "FLWOR" expression.

XPath engines typically analyze an XML document as an XML tree by representing each element of the XML document as a node in the XML tree. The XML tree may include parent-child nodes that directly correspond to the nested elements in the XML document. For more information regarding XPath and XQuery please visit the proposed recommendations of W3C which currently reside at http://www.w3.org/TR/xpath20/and http://www.w3.org/TR/xquery/ respectively.

Several XML Database Management Systems (DBMS) support XQuery and/or SQL/XML languages, which are based on navigational primitives in the form of XPath expressions. Typically, these systems either model each XPath step as a separate query plan operator, or employ holistic approaches that can evaluate multiple steps of a single XPath expression. Furthermore, some proposals recommend executing as many XPath expressions as possible within a single FLWOR block simultaneously in a data streaming context.

However, combining all possible XPath expressions for concurrent execution can result in significant performance degradation for two reasons. First, grouping all XPath expressions on a single document does not always work if the query involves more than one data source or has nested query blocks. Second, merging XPath expressions may result in unnecessary execution of branches that would be filtered by predicates in other branches or elsewhere in the query.

SUMMARY OF THE INVENTION

The present invention has been developed to provide an apparatus, system, and method for optimization of XPath expressions in a database management system configured to accept XML queries.

A method is presented for receiving an XQuery representation, partitioning the XQuery representation, merging the one or more XPath expressions, and generating one or more execution plans. The method may also include splitting each of the XPath expression blocks for each query execution plan, determining a cardinality and an execution cost, and determining an aggregate cardinality for each query execution plan.

In one embodiment, the method includes receiving an XQuery representation. The method may also define partitioning the XPath expressions within the XQuery representation into a plurality of XPath expression clusters. The XPath expression clusters may comprise one or more XPath expressions and those in each cluster reference a common document. Furthermore, the XPath expressions in each cluster may be hierarchically related to each other such that branch nodes of the cluster are executable independent of nodes in other XPath expression clusters.

In another embodiment, the method defines merging the one or more XPath expressions into one or more expression trees for each XPath expression cluster. A single expression tree may correspond to an XPath expression block. Also, the one or more XPath expression blocks may be incorporated into one or more query execution plans. In one embodiment, the method generates one or more query execution plans from the one or more XPath expression blocks.

The one or more query execution plans may be generated by determining a cardinality according to database statistics and an execution cost for each XPath expression block within each query execution plan. Furthermore, one or more query execution plans may be generated by splitting each of the XPath expression blocks into one or more ordered fragments based on the cardinality and the execution cost. Finally, in another embodiment, the method may determine an aggregate cardinality for each query execution plan and an aggregate execution cost for each query execution plan.

In one embodiment, the method may include selecting an optimal query execution plan from the one or more query execution plans, the optimal query execution plan comprising a lowest execution cost. In another embodiment, partitioning the XQuery representation generates a dependency graph. In this embodiment, the dependency graph comprises a node for each XPath expression. Furthermore, the nodes may be hierarchically related to each other by dependencies between corresponding XPath expressions.

In another embodiment, merging the one or more XPath expressions further comprises merging one or more XPath expressions in response to determining that a resulting expression tree does not contain a dependency graph cycle. In one embodiment, splitting each of the XPath expression blocks for each query execution plan further comprises determining an early-out cost computation for each XPath expression block. The early-out cost computation may include a navigation cost and a buffer cost.

Furthermore, the XPath expression block, in certain embodiments, includes a set of XPath expressions for a plurality of XPath bindings. Furthermore, this set of XPath expressions may be configured for simultaneous execution by an XML Scan (XSCAN) operator during execution of the XQuery representation.

An apparatus for optimization of XPath expressions in a database management system configured to accept XML queries also is provided with a plurality of modules configured to functionally perform the necessary steps as described in the method above. These modules in the described embodiments include a receiving module, a partition module, a merging module, a generation module, the generation module comprising a fragmentation module, and a determination module. Furthermore, the modules may also include a computation module of the fragmentation module and a selection module.

A system of the present invention is also presented to implement the above mentioned method for optimization of XPath expressions in a database management system configured to accept XML queries. The system may be embodied as a network configured to communicate data between a plurality of devices, a client in communication with the network, and a server in communication with the network.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, or semiconductor system, apparatus, device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1A:
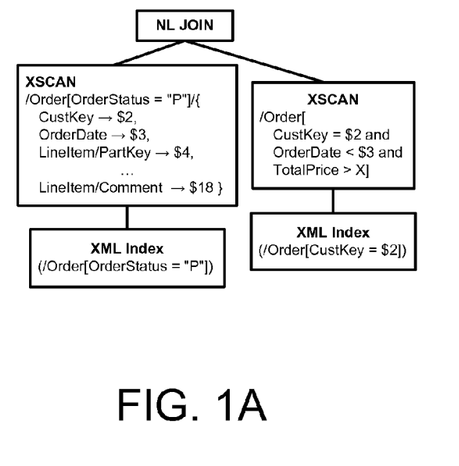
FIGS. 1A-1D are schematic block diagrams illustrating embodiments of example query execution plans.

FIG. 1A illustrates one embodiment of a query execution plan, or ordered set of steps used to access information in the database. The query execution plan in FIG. 1A pertains to the following example XQuery which accesses pending orders of customers who previously made orders above a certain price X:

```
Query 1
for $ord in db2-fn:collection('TPCH.DOC')/Order[
            OrderStatus = "P"]
let
    $c1 := $ord/LineItem/PartKey,
    ...
    $c15 := $ord/LineItem/L__Comment
where exists( db2-fn:xmlcolumn('TPCH.DOC')/Order[
        CustKey = $ord/CustKey and
        OrderDate < $ord/OrderDate and
        TotalPrice > X] )
return <res>...</res>;
```

Query 1 extracts all 15 sub-elements of the lineitems of the pending order and constructs a result object using the lineitems. If all possible XPath expressions are merged in the query, the optimizer must use only two XML Scan (XSCAN) operators (a single operator referred to hereinafter as 'XSCAN'), and use a query execution plan like the query execution plan in FIG. 1A.

An XSCAN operator models the XML Navigation runtime algorithm. The XML Navigation runtime module evaluates paths and predicate constraints over the native XML store, by traversing the XML storage following the parent-child relationship between the nodes. The XML Navigation runtime returns node references (logical node identifiers) and atomic values to be further manipulated by other runtime operators similar to a relational SCAN operator. XSCAN can also apply query predicates to reduce the size of the data returned by the operator. An XSCAN operator operates on one document at a time, and evaluates the input expression tree over that document, returning a tuple of variable bindings. Furthermore, the XSCAN operator according to embodiments of the present invention is capable of simultaneously evaluating an XPath expression block containing multiple variables, also referred to as multiple variable bindings.

Furthermore, the XSCAN enables scanning and navigating through XML data to evaluate a single XPath expression. XSCAN receives references to XML nodes as input, and uses these nodes as starting points for navigation. Furthermore, XSCAN returns references to XML items that satisfy the path expression. As known by one skilled in the art, the NL JOIN operator is the standard nested loop join algorithm used by many database products.

Figure 1B:
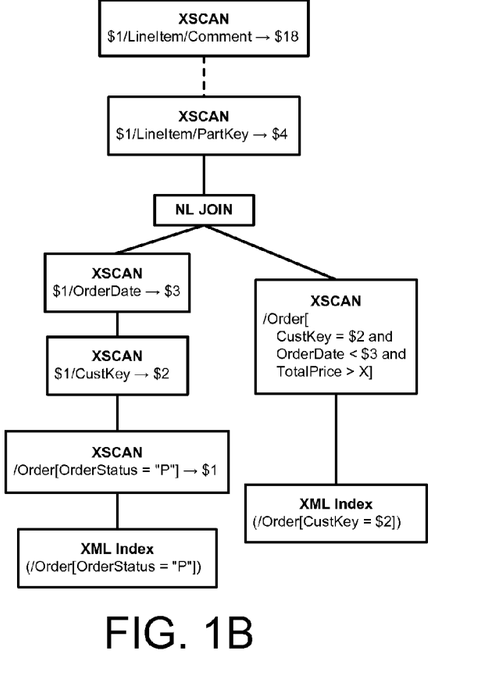

FIG. 1B illustrates another embodiment of a possible execution plan for Query 1. In this execution plan, no XPath expressions are merged, therefore requiring a separate XSCAN operation for each XPath expression and the 15 LET clauses are executed separately after the join. The execution of Query 1 would receive a performance benefit from merging the 15 LET clauses with the first FOR clause as illustrated in FIG. 1A if the [TotalPrice >X] predicate is not selective. However, if the predicate is selective, the LET clauses do not need to be executed for the Order elements eliminated by the join, and a performance increase would be obtained with the plan in FIG. 1B. The numerous XSCAN operations add an unnecessary overhead increase if the predicate is selective.

Figure 1C:
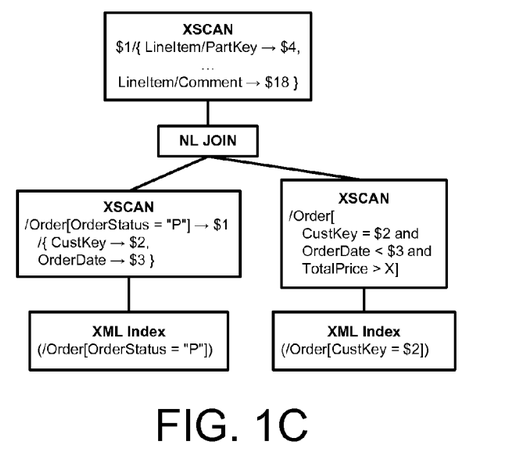
Figure 1D:
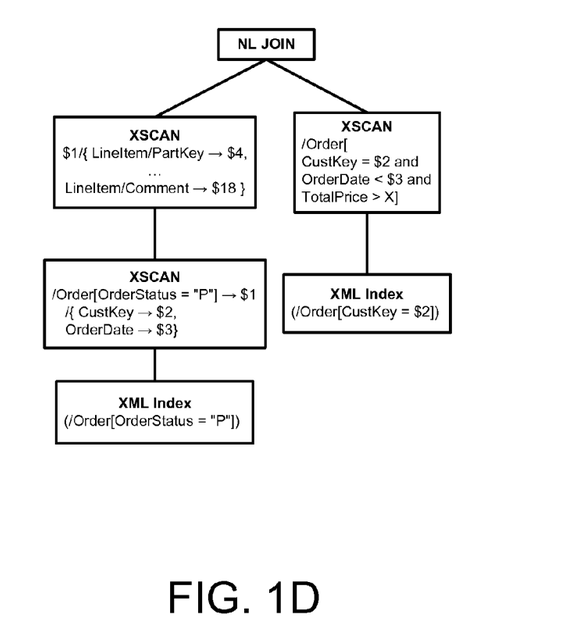

FIGS. 1C and 1D illustrate other embodiments of execution plans for Query 1. In these plans, certain XPath expressions have been merged under a common XSCAN operator to maximize performance. The plans in these FIGS. 1C and 1D use both merging and separate XPath expression execution. Furthermore, the execution cost of the plan in FIG. 1C and the execution cost of the plan in FIG. 1D may vary according to the associated variable values in the XML document.

While FIG. 1A represents an execution plan in which all possible XPath expressions are merged and FIG. 1B represents an execution plan in which all possible XPath expressions are separated, FIGS. 1C and 1D represent intermediate approaches. FIGS. 1C and 1D may obtain the benefit of both merges and separations, depending on the data being returned. Furthermore, whether FIG. 1C costs less than 1D also depends on the data.

Figure 2:
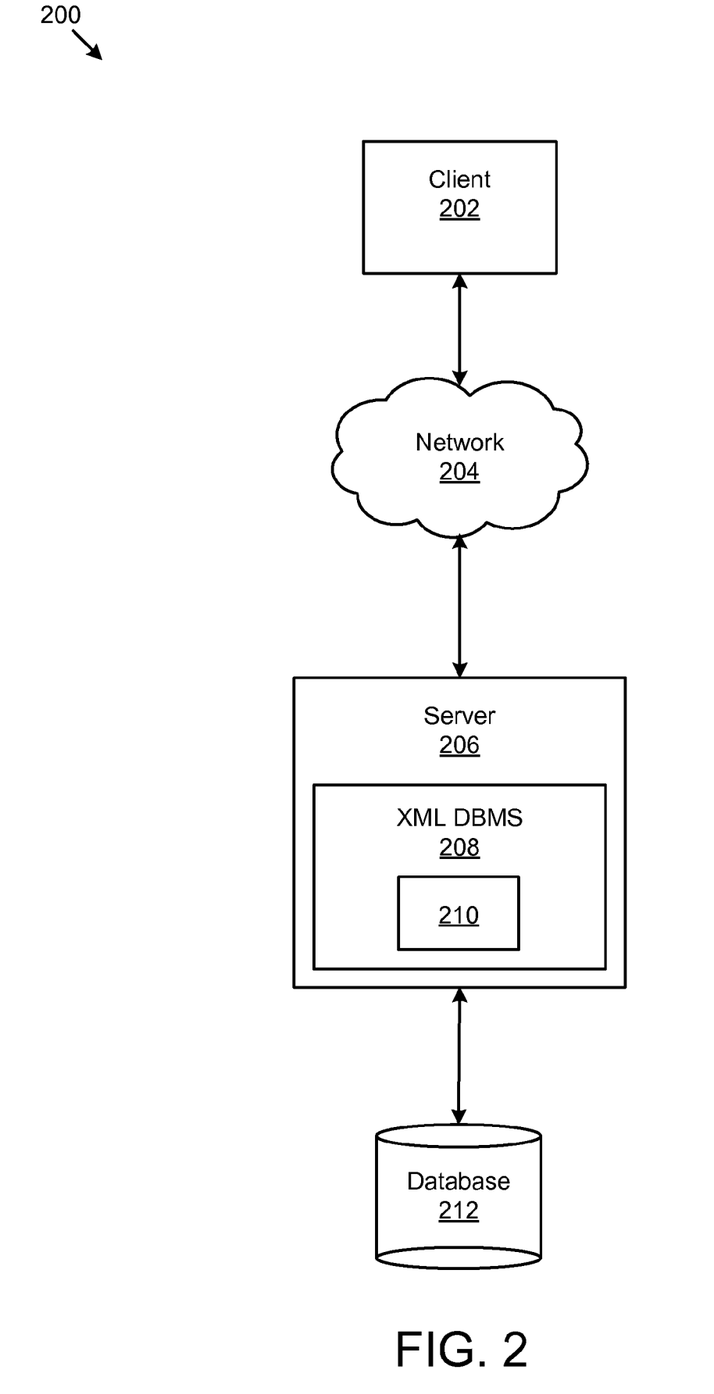
FIG. 2 is a schematic block diagram illustrating one embodiment of a system for optimization of XPath expressions in a database management system configured to accept XML queries.

FIG. 2 illustrates one embodiment of a system 200 for optimization of XPath expressions in a database management system configured to accept XML queries. The system 200 includes a client 202 in communication with a network 204. Furthermore, a server 206 with an XML DBMS 208 is also in communication with the network 204. The XML DBMS 208 also comprises an XML Query optimizer 210. Furthermore, the server 206 also comprises a database 212. Those of skill in the art recognize that the system 200 may be simpler or more complex than illustrated, so long as the system 200 includes modules or sub-systems that correspond to those described herein.

The client 202 may operate an application capable of sending SQL/XML queries or XQueries. Furthermore, the application may comprise an International Business Machines (IBM) DB2 pureXML™ (pureXML) client application capable of interfacing with a pureXML application on the server 206. Likewise, the XML DBMS 208 on the server 206 may be capable of accepting SQL/XML queries or XQueries and may comprise the pureXML DBMS. pureXML™ is a hybrid relational and XML database engine providing native XML storage, indexing, navigation and query processing through both SQL/XML or XQuery. The XML navigation component of pureXML is based on a TurboXPath streaming engine, capable of executing multiple correlated XPath expressions in a single traversal of an XML fragment.

The XML Query optimizer 210 determines an optimal query execution plan based on the XQuery provided. In certain embodiments, the XML Query optimizer 210 is configured to determine an optimal query execution plan from among query execution plans that include XSCAN operators that support multiple variable bindings. The XML Query optimizer may be configured to optimize both XQueries and SQL/XML queries. Furthermore, the XML Query optimizer 210 may use a global heuristic optimizer to determine which XPath expressions should be merged for concurrent evaluation. Also, the XML Query optimizer 210 may use a global cost-based optimizer to select a resulting query execution plan involving one or more XSCAN operators. The global heuristic optimizer and global cost-based optimizer involve optimization of the XML Query as a whole. Moreover, the XML Query optimizer 210 may use a local cost-based optimizer to further split the XPath expressions in each XSCAN XPath expression block into fragments and execute the fragments in a particular order to further optimize execution. The local cost-based optimizer involves optimization of each individual XSCAN block in the execution plan. The XML Query optimizer 210 is part of the XML DBMS 208 compiler which receives an XQuery representation and produces a query execution plan. One skilled in the art would recognize that the XML Query optimizer could also receive an SQL/XML representation to produce a query execution plan.

The global-plus-local optimization approach allows for the optimization of complex query expressions without sacrificing query planning options. For maximum flexibility, the optimizer should consider every feasible order of execution of XPath steps in the query. The Query 1 above contains 38 XPath Steps and two table accesses. Thus, optimizing this query is equivalent to optimizing a 40-way join. By applying heuristics and partitioning the problem into pieces that can be solved in isolation, the XML Query optimizer 210 is able to successfully optimize complex queries with many large XPath expressions.

The database 212 may be capable of storing and processing XML data or a combination of XML data and relational data. The network 204, in turn, may comprise LANs, WANs, SNA networks, Internet and the like and is used for data and message transmission.

Figure 3:
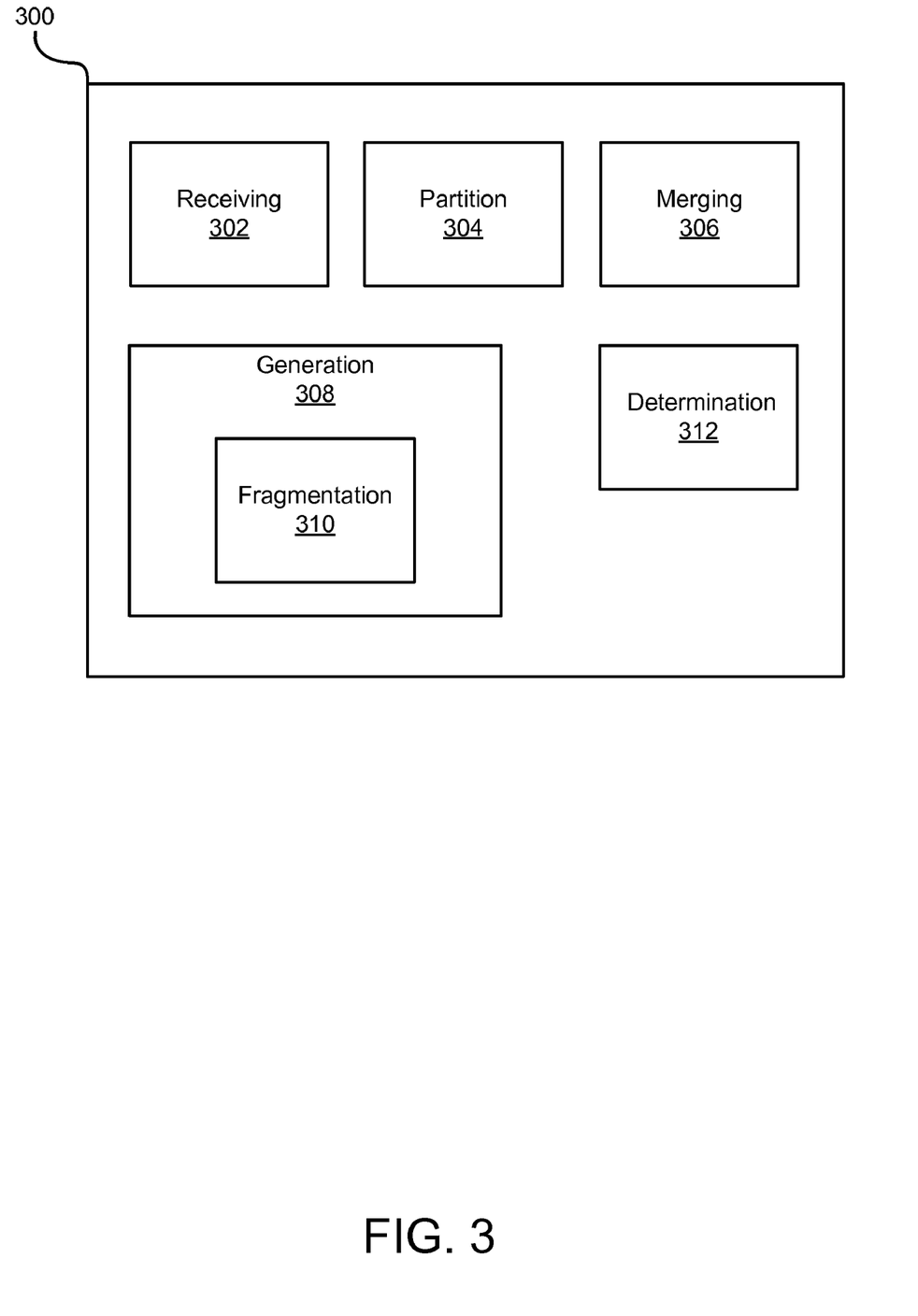
FIG. 3 is a schematic block diagram illustrating one embodiment of an apparatus for optimization of XPath expressions in a database management system configured to accept XML queries.

FIG. 3 illustrates one embodiment of an apparatus 300 for optimization of XPath expressions in a database management system configured to accept XML queries. The apparatus 300 depicts one embodiment of an XML Query optimizer 210 and includes a receiving module 302, a partition module 304, a merging module 306, a generation module 308, a fragmentation module 310, a block determination module 312, and a query determination module 314.

In one embodiment, the receiving module 302 receives an XQuery representation. The XML Query representation is an internal model of a query parsed by the XML DBMS 208 and input to the XML DBMS 208 compiler. Furthermore, the XQuery representation may comprise a Query Graph Model (QGM). A QGM graph may consist of operations (boxes) and quantifiers (arcs) which represent the data flow between operations. In addition, a QGM or representation may comprise one or more ExpBox operations. An ExpBox represents an XPath expression and produce tuples of variable bindings and contains an annotated XPath Step (XPS) tree, where each individual binding is an instance of the XQuery data model, and is either a singleton (FOR) or a sequence (LET). The output columns of an ExpBox are the extraction points of the XPS tree it contains.

An XPS trees is an expression tree representation of XPath statements made up of one or more XPS nodes. An XPS node in an XPS tree represents a step in the XPath statement. Moreover, XPS trees represent XPath expressions by capturing the data flow step-by-step through XPS nodes, and hence are able to model all XQuery axes, including parent, as well as any complex XQuery expressions as the predicate.

Furthermore, an XPS node has three or more positional children. The first child of an XPS tree node is the axis (either the special "root" or one of the six axes allowed in XQuery). The second child of an XPS tree node is the test, which is either a name or a kind test, or a wildcard test "*.". The third child of an XPS tree node is the predicate. The predicate is optional: not every XPath step has a predicate. In the case when there is no predicate on a step, this information is expressed with a NULL constant. Hence, the third child always denotes the predicate. The rest of the children represent the next steps, and are XPS tree nodes. An XPS tree node which does not have a next step, and is reachable through next steps is called an extraction point, as this node represents the result of the XPath reachable from the root. An extraction point computes a variable binding. An XPath expression block computes multiple variable bindings.

XPS trees are annotated with flags to capture the FOR/LET semantics of FLWOR expressions. The first flag is "isExtraction" which is set to true if the XPS node is linked to an output column of the containing ExpBox and represents a variable binding, computing the result of an XPath expression. The next flag is "isFor" which is set to true if the XPS node represents the last step of a FOR binding. If this flag is set to false, then LET is implied. Finally, the last flag is "EmptyOnEmpty" which signals when an empty sequence needs to be created if there is no qualifying node. This flag may be set to true only if the XPS node is marked as extraction point.

Furthermore, an extraction point is an XPS node whose "isExtraction" flag is set to true. A multiple-extraction (MEP) XPS tree is a tree $T(r,E)$, where r is the root of the tree and is an XPS node, E is a set of extraction points.

The partition module 304, in one embodiment, partitions the XPath expressions within the XQuery representation into a plurality of XPath expression clusters as part of a heuristic global optimization as described below. The partition module 304 may cluster a set of XPath expressions within a single QGM query block that are over the same document. Furthermore, the XPath expressions in each cluster must be hierarchically related to each other such that branch nodes of the cluster are executable independent of nodes in other XPath expression clusters. The branch nodes are the nodes between the root and the leaves of a dependency graph which is explained in greater detail below.

A QGM query block is not defined by the user query, because rewrite transformations performed by the XML DBMS 208 to simplify the QGM before being input to the compiler may merge multiple query blocks, effectively unfolding nested FLWOR and SQL/XML expressions into a single query block. Therefore, as used herein, a QGM query block is a SELECT box, after all rewrite and XPath transformations have been applied. The clustering is performed by the partition module 304 by clustering ExpBoxes comprising XPath expressions of the XQuery. Furthermore, the ExpBoxes in the same cluster that feed other ExpBoxes in the same cluster may not have interactions with other operations in the query outside of the cluster.

Additionally, the partition module 304, in one embodiment, may generate a dependency graph which has a node for each XPath expression. Furthermore, the nodes may be hierarchically related to each other by dependencies between corresponding XPath expressions. The dependency graph is used to determine the clusters as well as ensure that the merge rewrite maintains a valid data flow in QGM. When determining whether a dependency exists, an ExpBox is dependent on another ExpBox if the output columns of the latter are used as input to evaluate the former. A dependency graph $G(V,E)$ of an SELECT box s is a directed acyclic graph where:

1. $V=\{x|x$ is an ExpBox underneath $s\}$, and
2. $E=\{(v_1, v_2)|v_2$ is dependent on $v_1\}$.

The partition module 304 first computes a dependency graph for the SELECT box it is currently examining. Then, the partition module 304 uses the dependency graph to assign cluster numbers to individual ExpBoxes.

In one embodiment, the partition module 304 may begin assigning cluster numbers by identifying a set of source nodes S in the dependency graph (i.e., a set of ExpBoxes that do not depend on others). These ExpBoxes represent XPath expressions whose context is either a document root, or whose context comes from other operations outside the current SELECT box. All nodes in S get cluster number 0.

For the rest of the ExpBoxes, the cluster number is assigned based on their dependencies and their participation in external operations. An ExpBox participates in an external operation if one of its output columns is used in a subquery outside the current SELECT box, or it participates in a value-based join with either a relational column or another XML document. Furthermore, an ExpBox also participates in an external operation, if any of the ExpBoxes that depend on it participates in an external operation. Starting with nodes in S, the partition module 304 traverses the dependency graph, and for every node v considers its dependants. If none of the dependant ExpBoxes participate in external operations, all of them may get the same cluster number as v (denoted $cn(v)$). If some of the dependant ExpBoxes do participate in external operations, these ExpBoxes get cluster number $cn(v)$, while the rest of the dependants of v, get cluster number $cn(v)+1$.

The merging module 306, in one embodiment, merges the one or more XPath expressions in each cluster into expression trees (one or more XPS trees) as part of a heuristic global optimization. Only ExpBoxes within the same cluster will be considered for merging. Also, the ExpBoxes will be merged unless the resulting pattern tree will violate the valid data flow in QGM or because the resulting expression cannot be expressed in a single pattern tree. Specifically, the ExpBoxes will not be merged if the resulting dependency graph is acyclic, or the resulting expression cannot be expressed in a single XPS tree (for example, when there is a predicate on a context step that cannot be rewritten).

The merging module 306 may generate multiple XPS trees if the partition module 304 produced multiple clusters. For example, the merging module 306 may generate two expression trees from Query 1: one expression tree for the XPath expression /Order[OrderStatus="P"]/{CustKey,OrderDate}, which produces the values needed for the join, and the other expression tree for all 15 LET clauses. The following pseudo code algorithm illustrates one embodiment of a merging module 306:

| Sample Pseudo Code 1 |
|---|
| MultipleExtMerge<br>Input: QGM after rewrites<br>Output: QGM containing MEP XPS trees<br>       with multiple output variables<br>( 1) for each SELECT box do<br>( 2) compute dependency graph<br>( 3) ClusterExpBoxes<br>( 4) for every two ExpBox underneath do<br>( 5) if (both have the same cluster id)<br>( 6)   and (one ExpBox computes context of other<br>( 7)   or they both have the same context) then<br>( 8) if (CircularDependency(E1,E2) = false) then<br>( 9)     mergeExpBoxes(E1,E2)<br>(10)     if (successful) then<br>(11)       update dependency graph<br>(12)       reset iteration over ExpBoxes |

Before merging two ExpBoxes, the merging module 308 may check whether merging the two ExpBoxes would create a cycle in the dependency graph by employing a standard cycle detection algorithm known in the art. Every time the merging module 308 merges two ExpBoxes, the dependency graph is updated to maintain a valid data flow in the query graph.

The merging module 306 may use an XPath merge routine to create the maximal XPS tree, which contains as many extractions as possible. The merging module 306 looks at two ExpBoxes at a time and merges them if the ExpBoxes do not create a cycle in the dependency graph. In addition, suppose the merging module 308 is trying to merge two ExpBoxes, e1 and e2, containing XPS trees $xps_1$ and $xps_2$, respectively in the following two cases:

Case 1: $xps_1$ computes the context of $xps_2$
    Case 2: $xps_1$ and $xps_2$ have the same context node In Case 1, the merging module 308 locates the XPS node n in $xps_1$, which is an extraction point and computes the context variable of $xps_2$. The merging module 308 then, removes the first step of $xps_2$ ($x/a/b$ becomes /a/b). The first step in an XPS tree specifies the context of navigation, so for example, in $x/a/b, $x is the context step. Finally, we insert the remaining steps of xps$_2$ as next children into n. Note that due to earlier merges, the first step of xps$_2$ might have more than one next step. In Case 2, the merging module 308 removes the first step of xps$_2$ and inserts the remaining children as next steps into the context step of xps$_1$. Note that the context step of xps$_1$ is also the context for xps$_2$.

The first step cannot be simply discarded when there is a predicate on the context step of xps$_2$ in Case 1, and on the context step of either xps$_1$ or xps$_2$ in Case 2. The solution is to rewrite xps$_2$ in Case 1 (xps$_1$ and xps$_2$ in Case 2), by injecting an extra self step, and moving the predicate to this new self step. This simple rewrite will transform an XPath expression of the form $i[pred]/optional_next_steps into $i/self::node( )[pred]/optional_next_steps. However, this transformation is only possible: 1) if the context variable is not a LET binding, and 2) the predicate is not a positional predicate (a predicate which depends on context position or context sequence, such as fn:last or fn:position).

The generation module 308, in one embodiment, generates one or more query execution plans from the one or more XPath expression blocks. A query execution plan is a tree of operators. The generation module 308 may construct an XSCAN operator for every ExpBox in the final QGM representation of a query. For Query 1, the optimizer may produce the plans in FIGS. 1C and D, among others.

Furthermore, the generation module 308 may comprise cost-based local optimizer which comprises a fragmentation module 310. The fragmentation module 310, in one embodiment, as part of a cost-based local optimizer, determines a cardinality according to database statistics and an execution cost for each XPath expression block within each query execution plan. Furthermore, the fragmentation module 310 may split each of the XPath expression blocks for each query execution plan into one or more ordered fragments based on the cardinality and the execution cost. The cost-based local optimizer of the fragmentation module 310 functions locally for each individual XSCAN operator in the query execution plan, therefore, local optimization may be performed irrespective of what other expressions exist in the query.

The fragmentation module 310 instructs the XML navigation algorithm to split the XSCAN expression into a pipeline of one or more fragments based on a cardinality cost and an execution cost. For example, consider the following XQuery example:

---

Query 2

--- for $cust in db2-fn:xmlcolumn('CUST.DOC')/customer
where $cust/status = "I"
return
  <contact>
    {cust/name, $cust//phone}
  </contact>

---

This query could be merged into a single expression tree:

---

('CUST.DOC')/customer(FOR)[status = "I"]{
  ./name(LET),
  .//phone(LET)}

---

Executing this tree in one-pass streamed navigation would entail a full scan of every document. For each customer element, all its descendants need to be accessed to collect name and phone sequences. Since the qualifying status element could be the last child of a customer element, there is no opportunity to short-circuit the computation for customers that do not satisfy the predicate.

An alternative two-pass strategy may be to scan the children of a customer element, and only if a qualifying status child is found, scan all descendants of customer to collect the results. A two-pass execution strategy may outperform the singlepass execution by orders of magnitude. The choice between the strategies is made by the fragmentation module 310 depending on the analyzed data characteristics. Therefore, the fragmentation module may split Query 2 into two fragments: ('CUST.DOC')/customer(FOR)[status="I"], and {./name(LET), .//phone(LET)}.

However, not all XQueries may require fragmentation. If the fragmentation module 310 determines that the execution cost is less for one pass over the document and hence, the fragmentation module 310 does not fragment the XSCAN for execution.

In the worst case, the optimal fragment sequence may contain as many fragments as there are XPath Steps in the expression. However, in practice very few fragments are usually needed to achieve near-optimal performance. The first fragment in the sequence has by far the greatest effect on the XSCAN performance.

Therefore, the fragmentation module 310 combines greedy partitioning with a dynamic programming fragment ordering. In regards to the greedy partitioning algorithm, first, every single path fragment (i.e., some XPS node X and all its ancestors), is considered for the role of the first fragment in the sequence. The resulting XSCAN costs are estimated, assuming no further partitioning, and the fragment that results in the cheapest XSCAN is selected. If the cheapest resulting XSCAN is still more expensive than a single-pass evaluation, the algorithm terminates and a single-pass XSCAN evaluation is selected.

Next, the fragmentation module 310 evaluates adding other paths into the first fragment as long as the addition lowers the overall XSCAN cost estimate. The most beneficial paths are added first. Once the beneficial path additions are exhausted, the first fragment is finalized. The XPS nodes of the tree, not included in the first fragment, now form one or more tree fragments. Each of these fragments could possibly be split further, so the same partitioning algorithm is recursively applied to each one of them.

The algorithm has polynomial complexity. In the worst case it will require $O(N^3)$ executions of XSCAN costing formulae, where N is the number of XPS nodes in the expression tree. Each XSCAN cost estimate may be computed by a single tree traversal in at most O(N) time. The resulting partitions may be ordered using standard pureXML join ordering algorithms, (i.e., full enumeration of the ordering alternatives using dynamic programming) unless the number of fragments is too large in which case greedy join ordering is used. The join ordering algorithms respect dependencies between fragments. For example, if fragment A contains parent of the root node of fragment B, then A must be executed before B. Thus, the first fragment picked by the greedy algorithm is guaranteed to remain first, since it contains the root of the XPS tree.

To determine cardinality, the fragmentation module 310 computes two values for every XSCAN operator: the cardinality and sequence size, which is the average number of XML items in the sequences that are being returned. The cardinality of an XSCAN operator is the product of the input cardinality, selectivity of all the applied predicates, and the fanout of the navigation expression (i.e., fanout represents the number of output rows produced by the navigation per average input).

To determine fanout, the fragmentation module 310 employs linear path data distribution statistics that contain information on how many times each path occurs in the XML collection, and on distribution of data values (if any) that can be found by following the path. To support MEP expressions, the cardinality module 404 computes (a) fanout of navigation trees with multiple next steps and extractions, and (b) sequence size for every column produced by the navigation expression. The fragmentation module 310 distinguishes between XPath Step (XPS) nodes inside predicate steps, called predicate XPS, and XPS nodes that are not inside any predicate of any ancestor XPS, or navigation XPS. For example, in /a[b/c=5]/d, XPath Steps /a and /d are navigation XPS and /b and /c are predicate XPS nodes.

The following pseudo code algorithm is one embodiment of a fanout computation algorithm of the fragmentation module 310:

Sample Pseudo Code 2

```
MultipleExtFanout
Input: Tuple-extracting XPS Tree.
Output: Fanout F and sequence size SS for every navigation XPS node.
(1) for each navigation XPS node in the top-down traversal of the input
XPS tree do
(2)   if (X.isFOR==true)
(3)     N(X) = St(X)/St(Y )
(4)     F(X) = N(X) * P(X)
(5)     SS(X) = 1
(6)   else
(7)     N(X) = SS(Y ) * St(X)/St(Y )
(8)     if (N(X) > 1)
(9)       SS(X) = N(X) * P(X)
(10)      F(X) = K-th moment of B(N(X), P(X))
(11)    else
(12)      F(X) = N(X) * P(X)
(13)      SS(X) = 1
(14) if (X.isEOE==true)
(15)   old_F = F(X)
(16)   F(X) = (1 − P(X))^N(X)
(17)   SS(X)* = old_F/F(X)
```

MultipleExtFanout runs in two steps. First, it traverses the predicate XPS nodes and uses the data distribution statistics to compute cumulative selectivity $P(X)$ for a predicate subtree of every navigation XPS X. If X does not have a predicate, $P(X)$ is defined to equal 1. Second, fanout F and sequence size SS of every navigation XPS X is computed in a single top-down traversal of the XPS tree by the algorithm of FIG. 4.

The fragmentation module 310 may model each step as navigation that computes a sequence of $N(X)$ items, followed by a predicate that applies to each item uniformly and independently. For an XPS marked as FOR, the $N(X)$ is the average number of XML items the navigation will find, per parent context. On line 3, Y is the XPS parent step of X. The $St(X)$ is the number of items found by a linear path from root to X, as estimated using the data distribution statistics. If X is the root, $St(Y)$ is defined to equal 1. Notice, that $F(X)$ computation for FOR steps does not take into account the sequence size of the input—it is taken into account by the parent computation, if the parent is a LET step.

For an XPS marked as LET the computation is more involved (lines 6-13), as it needs to account for the size of the context (parent) sequence. Also, sequences constructed by this XPS may need to be iterated a number of times by FOR-marked children, producing a Cartesian product for every sequence. In this case, the size of every sequence needs to be raised to the K-th power, where K is the number of FOR-marked children. In statistics, the average value of the elements of some list raised to the K-th power is called the K-th moment. Furthermore, it is assumed that for any XPS X the probability of a predicate evaluating to true is the same $P(X)$ for every element in the initial sequence of size $N(X)$ constructed by the navigation. Thus, final sequence sizes after the predicate application are distributed according to a binomial distribution with parameters $N(X)$ and $P(X)$. The K-th moment of a binomial distribution $B(N(X), P(X))$ is:

$$\sum_{i=0}^{N(X)} C_i^{N(X)} * P(X)^i * (1 - P(X))^{N(X)-i} * i^K$$

K is the number of children of X that are marked as FOR. Computationally simple closed formulas exist for small values of K, which is likely to be the case in practice. For larger K's there are well known approximation techniques. The K-th moment computation does not make sense for $N(X) \leq 1$. In this case the cardinality module 404 assumes that only singleton sequences are produced (lines 11-13).

To handle XPS marked as empty-on-empty (EOE), line 16 adds the number of empty sequences returned to $F(X)$. The $SS(X)$ is updated in line 17 to account for the fact that the total number of result nodes is still the same, but they are now spread over the new (larger) number of sequences.

Fanout of the navigation expression as a whole is computed after the entire XPS tree is traversed and all the node fanouts are assigned. Tree fanout is the product of all navigation node fanouts.

The determination module 312, in one embodiment, determines an aggregate cardinality for each query execution plan and an aggregate execution cost for each query execution plan. The aggregate cardinality and the aggregate execution cost are the total of the cardinality and execution cost for all operators in the query execution plan including XSCAN operators.

Figure 4:
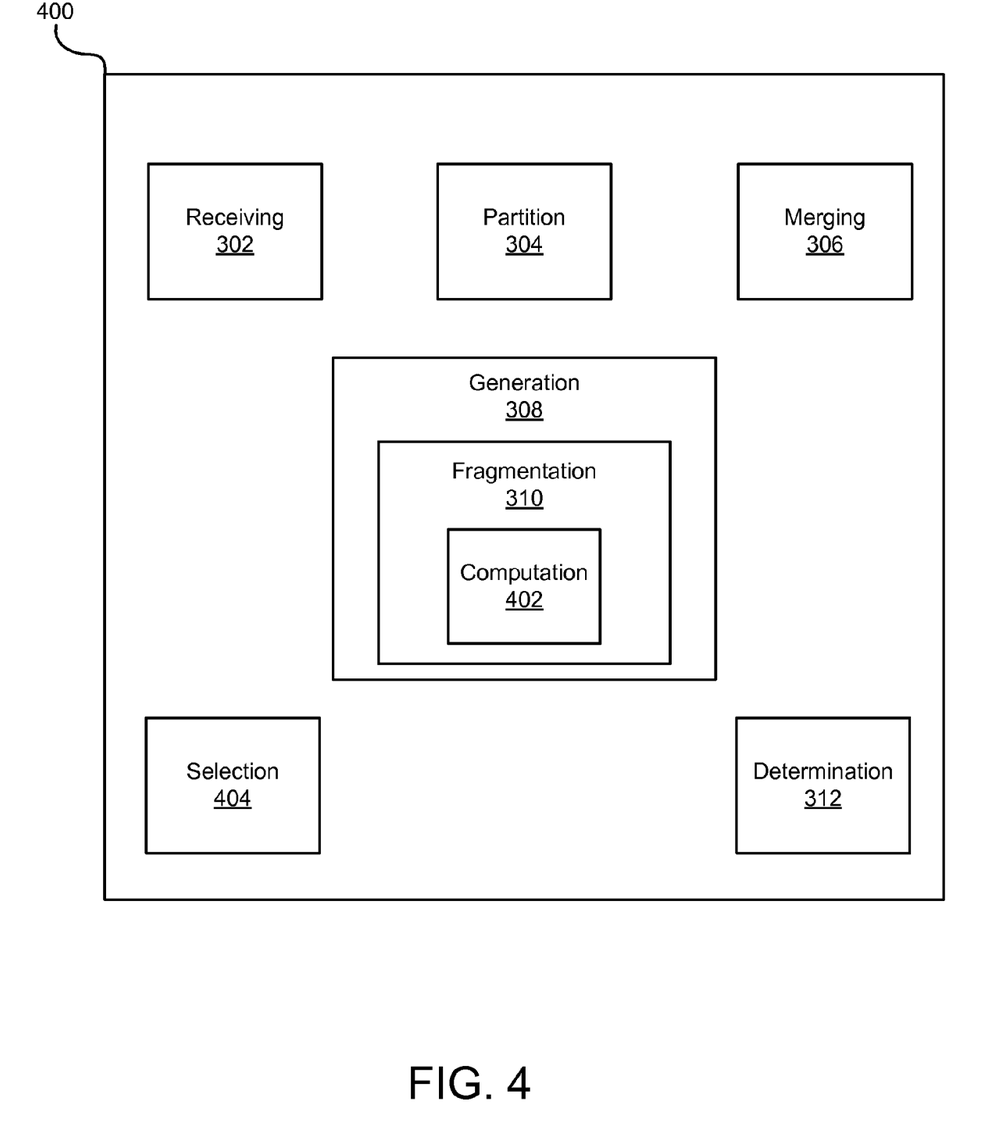
FIG. 4 is a detailed schematic flow chart diagram illustrating one embodiment of an apparatus for optimization of XPath expressions in a database management system configured to accept XML queries.

FIG. 4 illustrates another embodiment of an apparatus 400 for optimization of XPath expressions in a database management system configured to accept XML queries. The apparatus 400 includes the receiving module 302, the partition module 304, the merging module 306, the generation module 308, the fragmentation module 310, and the determination module 312 wherein these modules include substantially the same features as described above with relation to FIG. 3.

The fragmentation module 310 may also comprise a computation module 402 as part of the cost-based local optimization. The computation module 402, using an early-out cost estimation, computes the cost of navigation and buffering work performed by an XSCAN in order to execute the partitioned tree. The navigation cost, V, is modeled as the number of XPS nodes the XSCAN will need to scan in order to evaluate the XPath expression. The buffering cost is the number of XPS nodes needed to be buffered for the execution of the XPath expression. Both of the navigation and buffer costs treat navigation XPS nodes in the same way as predicate XPS nodes.

Let R be an XPath expression that is partitioned into two tree fragments, $r_1$ and $r_2$, in which $r_2$ will only be executed if $r_1$ returns a non-empty result. The early-out cost algorithm will only pick this partition if the sum of navigation and buffering costs, T, needed to evaluate $\{r_1, r_2\}$ using multi-pass execution is less than the sum of navigation and buffering costs needed to evaluate R using single-pass execution. Which contiguous tree fragments to be partitioned into $r_1$ or $r_2$ to achieve the optimal result depends on the selectivity of the predicates in different tree fragments, as well as on the statistics of every single XPS nodes in the whole expression. Thus, the choice of the early-out point will produce different early-out cost.

If X is an XPS node marked as a LET extraction point, then all the X elements need to be buffered because runtime is required to process all the elements in the X sequence before any result can be returned. In addition, when X is a non-extraction LET and has multiple next steps, navigation also needs to save all qualifying X elements in order to go back to process each next step after X. Buffering cost, B, refers to the number of nodes needed to be buffered because of LET extraction points or because X is a LET and has multiple next steps. Because nested navigation starts at the early-out point, the second type of buffering cost modeled by the computation module 402 is the number of nodes that need to be buffered only if X is the early-out point (i.e., X represents the division between $r_1$ and $r_2$) when X is marked as a LET but not an extraction point. This buffering expense is called overhead cost, O, because it only affects the overall cost of XSCAN when X is the early-out point.

The following pseudo code algorithm is one embodiment of an algorithm to determine the most optimal partition for R:

Sample Pseudo Code 3

```
GetLocalXPSPartition
Input: XPath expression R
Output: partition {r_1,r_2} of R
 (1)  V(R) = B(R) = 0; r1 = R
 (2)  EarlyOutCost(R, V(R), B(R), 0, r_1)
 (3)  T(R) = V(R) + B(R)
 (4)  r_2.V = V(R) – r_1.V
 (5)  r_2.B = B(R) – r_1.B
 (6)  T(r_2) = r_1.F * (r_2.V + r_2.B)
 (7)  T(r_1) = r_1.V + r_1.B + r_1.O
 (8)  T({r_1,r_2}) = T(r_1) + T(r_2)
 (9)  if (T({r_1,r_2}) < T(R))
(10)      return {r_1,r_2}
(11)  else
(12)      return R
```

The algorithm begins assuming that non-partitioned R is the best partition (line 1). The algorithm then invokes algorithm EarlyOutCost (line 2) to recursively traverse R top-down and then bottom-up. The top-down traversal computes the cost of each successive partition $r_1$ to find the cheapest $r_1$, whereas the bottom-up traversal collects the cumulative navigation and buffering costs of the entire XPath expression tree R. The sum of the final V and B costs on line 3 is the cost of executing the non-partitioned R using one-pass streamed navigation.

Given the cheapest $r_1$, the navigation and buffering costs of the remaining tree fragment $r_2$ are derived by subtracting the navigation and buffering costs of $r_1$ from those of R (line 4 and 5). Since $r_2$ will be executed for each qualifying node returned by $r_1$, the total cost of $r_2$ must be multiplied by the fanout of $r_1$ (line 6).

Line 7 calculates the total cost of $r_1$, which is the sum of the navigation, buffering and overhead costs of $r_1$. The next line gives us the total cost of executing the partitioned R by early-outing at $r_1$. This cost is then used to determine whether or not it is more efficient to do the local optimization at $r_1$ or if executing R in one-pass is still the optimal way (line 9-12).

The following pseudo code algorithm is one embodiment of the EarlyOutCost algorithm mentioned above:

Sample Pseudo Code 4

```
EarlyOutCost
Input: tuple-extraction tree X, bottom-up navigation cost V, buffer cost of
  parent B(Y), navigation cost of parent V(Y).
Output: bottom-up navigation cost V(X), top-down buffer cost B(X),
  top-down navigation cost V(X), best r_1 so far.
 ( 1) for each navigation XPS node in the
        top-down traversal of the input XPS
        tree do:
 ( 2)   C(X) = N(X) * P(X)
 ( 3)   if ((X isLET and isExtrPt) or
 ( 4)       (X isLET and isNotExtrPt and
            hasMultSteps))
 ( 5)     B_eo(X) = B(Y) + C(X)
 ( 6)   else
 ( 7)     B_eo(X) = B(Y)
 ( 8)   if (X isLET and isNotExtrPt and
            hasNoMultSteps)
 ( 9)     O_eo(X) = C(X)
 (10)   V_eo(X) = V(Y) + St(Y/*) + St(X_p)
 (11)   F_eo(X) = F(X) * numNonNullDoc / St(X)
 (12)   if (V_eo(X) * F_eo(X) < r_1.V * r_1.F)
 (13)     r_1 = X
 (14)     r_1.B = B_eo(X)
 (15)     r_1.O = O_eo(X)
 (16)     r_1.V = V_eo(X)
 (17)     r_1.F = F_eo(X)
 (18)   B(X) = B_eo(X)
 (19)   V(X) = St(Y/*) + St(X_p) +
          sum(V(X.nextStep))
```

In addition to N(X), P(X) and F(X) estimated by algorithm MultipleExtFanout in Sample Pseudo Code 2, the following estimates are also used in the computation:

R—the query XPath expression to be partitioned (i.e., a[b=1]/c[d/e=2]/f).

X—current XPS node in the XPath expression (i.e., say /a[b=1]/c).

Y—parent of X (i.e., /a[b=1]).

$X_p$—predicate on X (i.e., [d/e=2]).

St(X)—number of nodes having the matching path starting from the query root to node X (i.e., St(/a/c) is the number of nodes that match path "/a/c").

St(Y/*)—number of children Y has (i.e., number of children all the "a" nodes have).

$St(X_p)$—number of nodes scanned to execute the predicate p on X (i.e., sum of St(/a/c/d)+St(/a/c/e)).

B(Y)—the number of nodes need to be buffered for the evaluation of Y.

V(Y)—number of nodes scanned in order to collect all the matching parent of X (i.e. number of nodes processed to get all the "a" nodes that have a child "b" having a value of 1).

For each XPS node X in the top-down traversal, the computation module 402 may calculate the navigation, buffering and overhead costs assuming that X is added to the first tree fragment $r_1$ and is the early-out point (lines 2-11). As mentioned previously, N(X) is the average number of items navigation will find per parent context and P(X) is the cumulative selectivity for the predicate subtree of X. Thus, the product of N(X) and P(X) is the total number of nodes matching the X step and its predicates per parent input (line 2).

If the computation module 402 is to early-out at X, then the early-out buffering cost is simply the number of nodes that have been buffered so far (line 7). However, if X is a LET and an extraction point or if X is a non-extracting LET and also has more than one next step, then the computation module 402 also needs to account for the number of nodes matching X and its predicates (lines 3-5). No overhead cost will incur unless X is a LET and not an extraction point and has zero or one next step (lines 8-9).

The early-out navigation cost is the sum of the navigation cost of the parents, plus the number of nodes needed to be scanned under Y in order to collect all the matching X nodes, plus the number of nodes needed to be scanned to evaluate the predicates on X (line 10). Note that the number of nodes scanned to get all the X nodes is simply the number of children of Y.

If the number of non-null documents in the whole collection is divided by the number of elements matching X path, the average number of elements matching path X per document is obtained. Therefore, this number is multiplied by the fanout of X (computed by algorithm MultipleExtFanout in Sample Pseudo Code 2), the early-out fanout of X (line 11) is obtained. On lines 12-17, X is made the new best $r_1$, if the cost of early-outing at X is cheaper than the previously chosen $r_1$.

Because the early-out cost is computed top-down, the computation module 402 may accumulate the cumulative buffering and navigation costs when going back up on the tree. The cumulative buffering cost is simply the total number of nodes buffered from root up to nodes X, inclusively (line 18). The navigation cost is the sum of matching X elements and its siblings, plus the number of nodes needed to be scanned to execute predicate on X, plus all the navigation cost of all next steps of X (line 18-19).

The selection module 404, in one embodiment, selects one of the one or more execution plans as part of a global cost-based optimization. The selection module 404 uses aggregate execution cost for each query execution plan of the XQuery, and selects the query execution plan with the lowest aggregate execution cost. The selected execution plan is then ready for execution.

Figure 5:
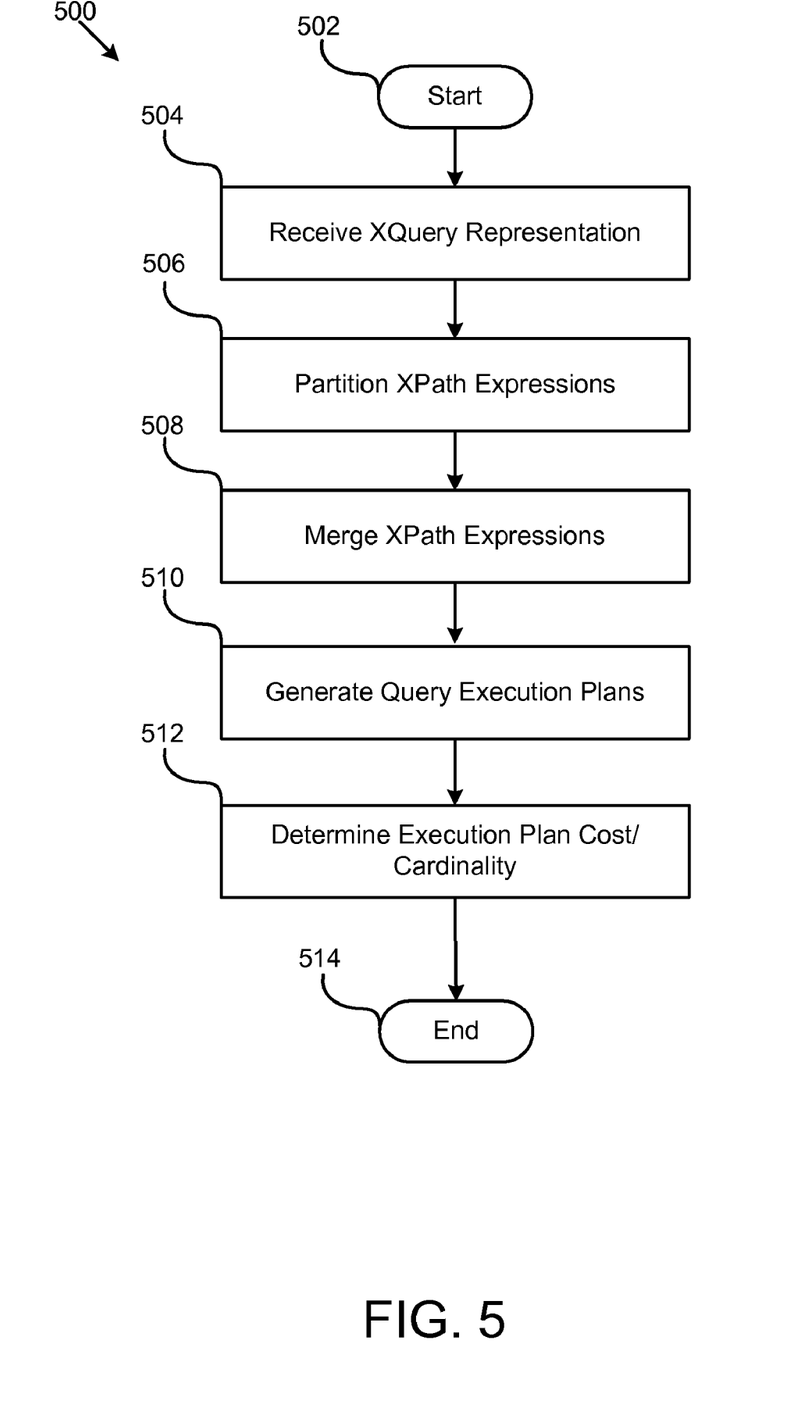
FIG. 5 is a schematic flow chart diagram illustrating one embodiment of a method for optimization of XPath expressions in a database management system configured to accept XML queries.

FIG. 5 illustrates one embodiment of a method 500 for optimization of XPath expressions in a database management system configured to accept XML queries. The method 500 starts 502 when the receiving module 302 receives 504 an XQuery representation. The partition module 304 then partitions 506 the XPath expressions in the XQuery representation into clusters. The XPath expression clusters may contain one or more XPath expressions which operate on a common document, and are hierarchically related to each other such that branch nodes of the cluster are executable independent of nodes in other XPath expression clusters. Next, the merging module 306 merges 508 the eligible XPath expressions in each cluster into expression trees for each cluster, each expression tree corresponding to an expression block. Then, the generation module 308 generates 510 one or more execution plans using the expression blocks.

This is performed as within each expression block for every execution plan, the fragmentation module 310 determines a cardinality according to database statistics and an execution cost for each XPath expression block and splits each of the XPath expression blocks into one or more ordered fragments based on these statistics. Finally, the determination module 312 determines 512 the aggregate cardinality for each expression block within each query execution plan and an aggregate execution cost for each query execution plan. Then, the method 500 ends 514.

Figure 6:
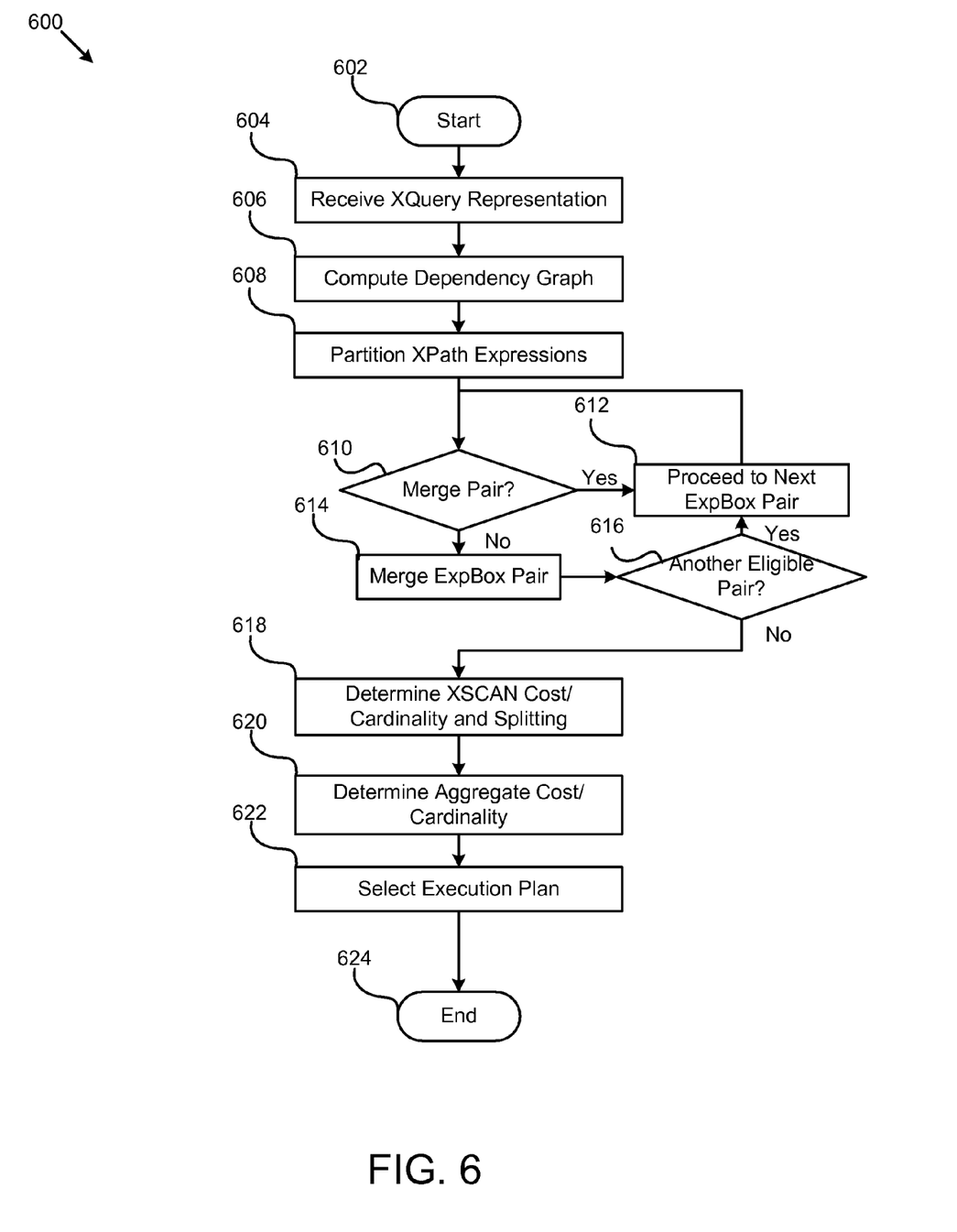
FIG. 6 is a detailed schematic flow chart diagram illustrating one embodiment of a method for optimization of XPath expressions in a database management system configured to accept XML queries.

FIG. 6 illustrates a detailed embodiment of a method 600 for optimization of XPath expressions in a database management system configured to accept XML queries. The method 600 starts 602 when the receiving module 302 receives 604 an XQuery representation in the form of a QGM. The partition module 304 computes 606 a dependency graph for the QGM and partitions 608 the XPath expressions in the QGM into clusters by assigning cluster numbers to ExpBoxes that are over the same document and ExpBoxes that are hierarchically related to each other such that branch nodes of the cluster are executable independent of nodes in other XPath expression clusters (meaning its execution does not affect execution of XPath expressions of other ExpBoxes). The merging module 306 then determines 610 whether a circular dependency would exist as a result of the merge between a pair of ExpBoxes, and whether the expression which is the result of the merge can be represented in a single XPS tree. If the merging module 306 determines 610 that a circular dependency would exist in the resulting expression tree, or the resulting expression cannot be expressed in a single XPS tree, then the merging module 306 proceeds 612 to the next pair of ExpBoxes for merge testing.

For example, one query fragment may read:

```
let $j:= $i//a/b
for $k in $j[2]/c
```

These two XPath expressions cannot be merged into the expression $i//a/b[2](→$j)/c, because the resulting expression cannot be expressed in a single XPS tree. The resulting expression returns the c children of the second b under every a element, whereas the original query asks for the c children of the second b under all a elements.

Conversely, if the merging module determines 610 that a circular dependency would not exist with the merge, and the resulting expression can be expressed in a single XPS tree, the merging module 306 merges 614 the Expbox into the expression tree. The merging module 306 then proceeds 612 with the next eligible pair of ExpBoxes. If the merging module 306 determines 616 that all ExpBoxes have been tested, the generation module 308 generates the possible query execution plans. This is performed as the fragmentation module 310 determines 618 a cardinality according to database statistics and an execution cost for each XPath expression block within each query execution plan. Next, the fragmentation module 310 splits each of the XSCAN blocks into one or more fragments. Also, the computation module 402 determines the estimated execution cost of the fragments to determine the exact fragmentation of the XSCAN blocks. Furthermore, the fragments may be further fragmented recursively to optimize efficiency. The determination module 312 determines 620 the aggregate cardinality for each query execution plan and an aggregate execution cost for each query execution plan. Finally, the selection module 404 selects 622 the execution plan with the lowest aggregate execution cost and the method 600 ends 624.

What is claimed is:

1. A method for optimization of Extensible Markup Language Path Language (XPath) expressions in a database management system configured to accept Extensible Markup Language (XML) queries, the method comprising:

receiving an XML Query (XQuery) representation;

partitioning XPath expressions within the XQuery representation into a plurality of XPath expression clusters, the XPath expression clusters comprising one or more XPath expressions, the one or more XPath expressions in each cluster hierarchically related to each other such that branch nodes of the cluster are executable independent of nodes in other XPath expression clusters, the one or more XPath expressions referencing a common document;

merging the one or more XPath expressions of each XPath expression cluster into one or more expression trees for each XPath expression cluster, a single expression tree corresponding to an XPath expression block, the one or more XPath expression blocks configured to be incorporated into one or more query execution plans;

generating one or more query execution plans comprising one or more XPath expression blocks, the one or more query execution plans by determining a cardinality according to database statistics and an execution cost for each XPath expression block within each query execution plan, and splitting each of the XPath expression blocks into one or more ordered fragments based on the cardinality and the execution cost; and determining an aggregate cardinality for each query execution plan and an aggregate execution cost for each query execution plan comprising the one or more XPath expression blocks.

2. The method of claim 1, further comprising selecting an optimal query execution from the one or more query execution plans, the optimal query execution plan comprising a lowest execution cost.

3. The method of claim 1, wherein partitioning the XQuery representation further comprises generating a dependency graph, the dependency graph comprising a node for each XPath expression, the nodes hierarchically related to each other by dependencies between corresponding XPath expressions.

4. The method of claim 1, wherein merging the one or more XPath expressions further comprises merging one or more XPath expressions in response to determining that a resulting expression tree does not contain a dependency graph cycle.

5. The method of claim 1, wherein splitting each of the XPath expression blocks for each query execution plan further comprises determining an early-out cost computation for each XPath expression block, the early-out cost computation comprising a navigation cost and a buffer cost.

6. The method of claim 1, wherein the XPath expression block comprises a set of XPath expressions for a plurality of variable bindings, the set of XPath expressions configured for simultaneous execution by an XML Scan (XSCAN) operator during execution of the XQuery representation.

7. An apparatus for optimization of Extensible Markup Language Path Language (XPath) expressions in a database management system configured to accept Extensible Markup Language (XML) queries, the apparatus comprising:

a computer readable storage medium storing computer program instructions;

a processor executing the computer program instructions, the computer program instructions comprising:

a receiving module configured to receive an XML Query (XQuery) representation;

a partition module of a global optimizer configured to partition the XPath expressions within the XQuery representation into a plurality of XPath expression clusters, the XPath expression clusters comprising one or more XPath expressions, the one or more XPath expressions in each cluster hierarchically related to each other such that branch nodes of the cluster are executable independent of nodes in other XPath expression clusters, the one or more XPath expressions referencing a common document;

a merging module of a global optimizer configured to merge one or more XPath expressions of each XPath expression cluster into one or more expression trees for each XPath expression cluster, a single expression tree corresponding to an XPath expression block, the one or more XPath expression blocks configured to be incorporated into one or more query execution plans;

a generation module configured to generate one or more query execution plans from the one or more XPath expression blocks, the generation module comprising:

a fragmentation module of a local optimizer configured to determine a cardinality according to database statistics and an execution cost for each XPath expression block within each query execution plan, splitting each of the XPath expression blocks into one or more ordered fragments based on the cardinality and the execution cost; and a determination module of a global optimizer configured to determine an aggregate cardinality for each query execution plan and an aggregate execution cost for each query execution plan comprising the one or more XPath expression blocks.

8. The apparatus of claim 7, further comprising a selection module configured to select an optimal query execution from the one or more query execution plans, the optimal query execution plan comprising a lowest execution cost.

9. The apparatus of claim 7, wherein the partition module is further configured to generate a dependency graph, the dependency graph comprising a node for each XPath expression, the nodes hierarchically related to each other by dependencies between corresponding XPath expressions.

10. The apparatus of claim 7, wherein the merging module is further configured to merge one or more XPath expressions in response to determining that a resulting expression tree does not contain a dependency graph cycle.

11. The apparatus of claim 7, wherein the fragmentation module further comprises a computation module configured to determine an early-out cost computation for each XPath expression block, the early-out cost computation comprising a navigation cost and a buffer cost.

12. The apparatus of claim 7, wherein the XPath expression block is simultaneously executed during execution of the XQuery representation by an XML Scan (XSCAN) operator, the XSCAN operator configured to execute a set of XPath expressions for a plurality of XPath bindings.

13. The apparatus of claim 7, wherein the XML database management system comprises a DB2 pureXML database management system.

14. A system for optimization of Extensible Markup Language Path Language (XPath) expressions in a database management system configured to accept Extensible Markup Language (XML) queries, the system comprising:

a network configured to communicate data between a plurality of devices;

a client in communication with the network;

a server in communication with the network, the server comprising:

a receiving module configured to receive an XML Query (XQuery) representation;

a partition module of a global optimizer configured to partition the XPath expressions within the XQuery representation into a plurality of XPath expression clusters, the XPath expression clusters comprising one or more XPath expressions, the one or more XPath expressions in each cluster hierarchically related to each other such that branch nodes of the cluster are executable independent of nodes in other XPath expression clusters, the one or more XPath expressions referencing a common document;

a merging module of a global optimizer configured to merge one or more XPath expressions of each XPath expression cluster into one or more expression trees for each XPath expression cluster, a single expression tree corresponding to an XPath expression block, the one or more XPath expression blocks configured to be incorporated into one or more query execution plans;

a generation module configured to generate one or more query execution plans from the one or more XPath expression blocks; the generation module comprising:

a fragmentation module of a local optimizer configured to determine a cardinality according to database statistics and an execution cost for each XPath expression block within each query execution plan, splitting each of the XPath expression blocks into one or more ordered fragments based on the cardinality and the execution cost; and a determination module of a global optimizer configured to determine an aggregate cardinality for each query execution plan and an aggregate execution cost for each query execution plan comprising the one or more XPath expression blocks.

15. The system of claim 14, further comprising a selection module configured to select an optimal query execution from the one or more query execution plans, the optimal query execution plan comprising a lowest execution cost.

16. The system of claim 14, wherein the partition module is further configured to generate a dependency graph, the dependency graph comprising a node for each XPath expression, the nodes hierarchically related to each other by dependencies between corresponding XPath expressions.

17. The system of claim 14, wherein the merging module is further configured to merge one or more XPath expressions in response to determining that a resulting expression tree does not contain a dependency graph cycle.

18. The system of claim 14, wherein the fragmentation module further comprises a computation module configured to determine an early-out cost computation for each XPath expression block, the early-out cost computation comprising a navigation cost and a buffer cost.

19. The system of claim 14, wherein the XPath expression block comprises a set of XPath expressions for a plurality of XPath bindings, the set of XPath expressions configured for simultaneous execution by an XML Scan (XSCAN) operator during execution of the XQuery representation.

20. The system of claim 14, wherein the XML database management system comprises a DB2 pureXML database management system.

* * * * *